(12) United States Patent
Karia

(10) Patent No.: US 12,260,076 B2
(45) Date of Patent: Mar. 25, 2025

(54) USER CONTROL MODE OF A COMPANION APPLICATION

(71) Applicant: ROKU, INC., San Jose, CA (US)

(72) Inventor: Snehal Karia, Fremont, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/204,168

(22) Filed: May 31, 2023

(65) Prior Publication Data

US 2024/0402890 A1 Dec. 5, 2024

(51) Int. Cl.
*G06F 3/04842* (2022.01)
*G06F 3/04845* (2022.01)

(52) U.S. Cl.
CPC ...... *G06F 3/04845* (2013.01); *G06F 3/04842* (2013.01)

(58) Field of Classification Search
CPC ................................................. G06F 3/048–05
See application file for complete search history.

(56) References Cited

U.S. PATENT DOCUMENTS

| | | | |
|---|---|---|---|
| 8,810,735 B2 * | 8/2014 | Lemus | H04N 21/44213 348/700 |
| 10,827,330 B2 | 11/2020 | Gross et al. | |
| 2005/0071885 A1 * | 3/2005 | Matoba | G11B 20/00086 725/38 |
| 2009/0262073 A1 * | 10/2009 | Rigazio | H04N 21/42208 345/158 |
| 2014/0123190 A1 * | 5/2014 | Song | H04N 21/4227 725/40 |
| 2015/0046811 A1 * | 2/2015 | Higashi | G06F 3/04847 715/716 |
| 2015/0154002 A1 * | 6/2015 | Weinstein | G06F 9/451 715/728 |
| 2015/0309715 A1 | 10/2015 | Higa et al. | |

(Continued)

FOREIGN PATENT DOCUMENTS

WO WO 2020/142293 A1 7/2020

OTHER PUBLICATIONS

European Search Report issued for European Patent Application 24176450.5 dated Oct. 2, 2024, 10 pages.

*Primary Examiner* — Daniel Rodriguez
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for enabling a user control mode of a companion application. An example embodiment operates by receiving a selection of a category of content on a media device. The content comprises contextual information. The media device is controlled by the companion application. In response to the receiving the selection, the embodiment enables a user control mode of the companion application. The embodiment then determines a control context for the companion application based on the contextual information. The embodiment then causes a user interface of the companion application to be modified based on the control context. The embodiment then provides for displaying the modified user interface of the companion application.

20 Claims, 8 Drawing Sheets

(56) References Cited

U.S. PATENT DOCUMENTS

| | | | | |
|---|---|---|---|---|
| 2015/0319503 | A1* | 11/2015 | Mishra | H04N 21/472 |
| | | | | 725/53 |
| 2017/0046023 | A1* | 2/2017 | Kumar | G06F 3/013 |
| 2017/0075516 | A1* | 3/2017 | Park | H04N 21/47202 |
| 2022/0141276 | A1* | 5/2022 | Sun | H04N 21/435 |
| | | | | 709/219 |
| 2023/0205556 | A1* | 6/2023 | Kwon | G06N 3/08 |
| | | | | 715/762 |
| 2023/0350627 | A1* | 11/2023 | Jeon | H04N 21/4316 |

\* cited by examiner

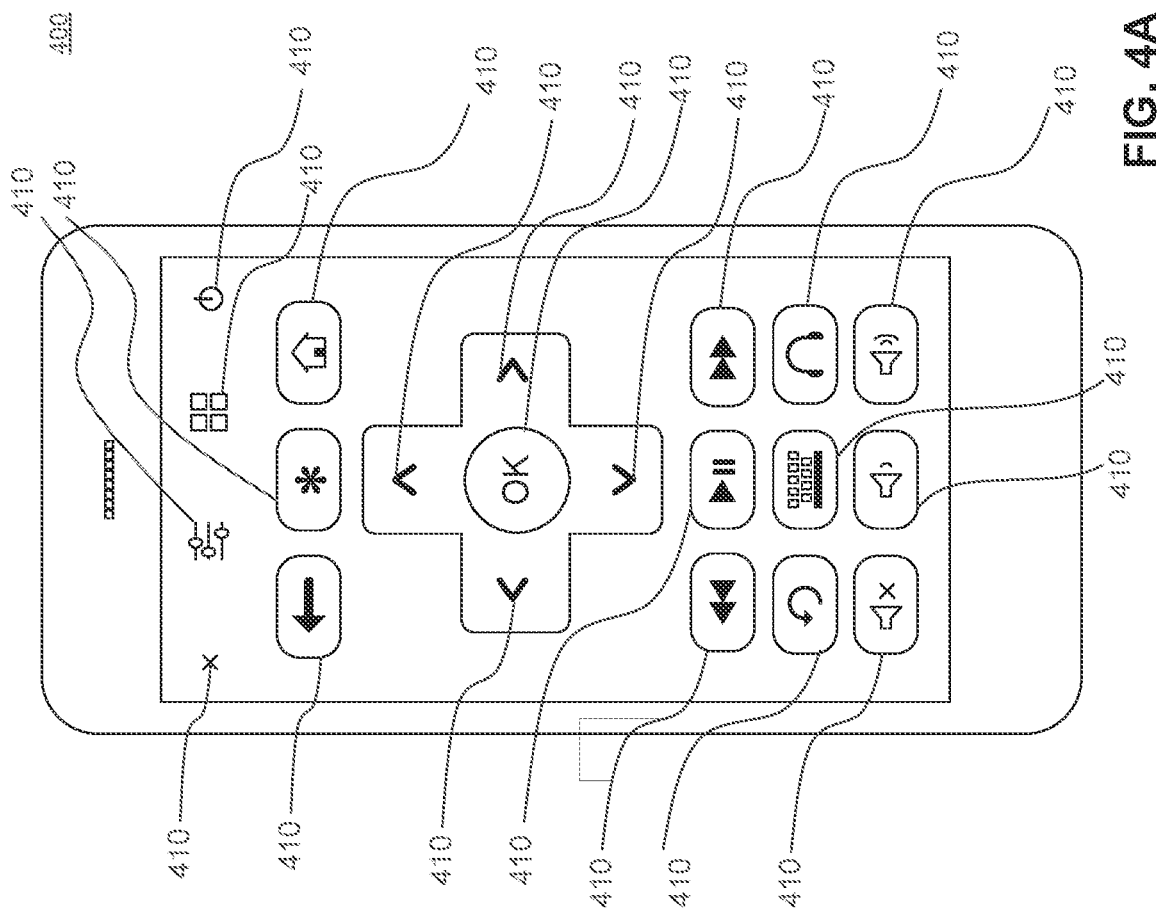

USER CONTROL MODE OF A COMPANION APPLICATION

TECHNICAL FIELD

This disclosure is generally directed to a user control mode, and more particularly to a user control mode of a companion application.

SUMMARY

Content, such as a movie or TV show, is typically displayed on a television or other display device for viewing by users. Content consumption devices such as televisions provide users with a wide variety of content for selection and viewing. Interacting with the content using a remote control is a common desire among users, particularly when it comes to media devices. Tasks such as selecting content, playing or pausing content, fast forwarding or rewinding content, changing channels, or adjusting volume and display settings often requires using a remote control.

However, using a remote control can be challenging due to design of a user interface, selections and/or button presses required for certain actions (e.g., menu actions). These often result in increased user frustration and reduced user satisfaction, especially for users of certain age groups.

Provided herein are system, apparatus, article of manufacture, method and/or computer program product embodiments, and/or combinations and sub-combinations thereof, for a user control mode of a companion application. The embodiments described herein are designed to solve the technological problems associated with interacting with a remote control, especially for users of certain age groups. In addition, the embodiments described herein improve a content viewing experience by providing a contextual-based user control mode of a companion application.

Certain embodiments operate by a computer-implemented method for enabling a user control mode of a companion application. The method includes receiving, by at least one computer processor, a selection of a category of content on a media device. The content comprises contextual information. The media device is controlled by the companion application. The method further includes, in response to the receiving the selection, enabling a user control mode of the companion application. The method further includes determining a control context for the companion application based on the contextual information. The method further includes causing a user interface of the companion application to be modified based on the control context. The method further includes providing for displaying the modified user interface of the companion application.

In some embodiments, the receiving the selection of the category of content comprises receiving a user input from a remote control associated with the media device, and the remote control comprises a tablet, laptop computer, smartphone, smartwatch, smart device or wearable device.

In some embodiments, the receiving the selection of the category of content comprises: receiving an audio command to select a content on the media device; identifying metadata associated with the content; and determining the category of content based on the metadata.

In some embodiments, the enabling the user control mode of the companion application comprises: identifying a characteristic of a user based on the selection of the category of content; and enabling the user control mode of the companion application based on the characteristic of the user.

In some embodiments, the determining the control context for the user interface based on the contextual information comprises: dynamically determining the control context based on a media stream currently being played on the media device.

In some embodiments, the causing the user interface of the companion application to be modified based on the control context comprises causing a display of a user interface element in the user interface of the companion application to be modified based on the control context.

In some embodiments, the method further includes receiving a termination of the selection of the category of content on the media device; and in response to the detecting the termination of the selection, disabling the user control mode of the companion application.

Other embodiments are directed to a system that includes at least one processor configured to perform operations including receiving a selection of a category of content on a media device. The content comprises contextual information. The media device is controlled by the companion application. The operations further include, in response to the receiving the selection, enabling a user control mode of the companion application. The operations further include determining a control context for the user interface. The operations further include causing a user interface of the companion application to be modified based on the control context. The operations further include providing for displaying the modified user interface of the companion application.

In some embodiments, the operation of the receiving the selection of the category of content comprises receiving a user input from a remote control associated with the media device, and the remote control comprises a tablet, laptop computer, smartphone, smartwatch, smart device or wearable device.

In some embodiments, the operation of the receiving the selection of the category of content comprises: receiving an audio command to select a content on the media device; identifying metadata associated with the content; and determining the category of content based on the metadata.

In some embodiments, the operation of the enabling the user control mode of the companion application comprises: identifying a characteristic of a user based on the selection of the category of content; and enabling the user control mode of the companion application based on the characteristic of the user.

In some embodiments, the operation of the determining the control context for the user interface based on the contextual information comprises: dynamically determining the control context based on a media stream currently being played on the media device.

In some embodiments, the operation of the causing the user interface of the companion application to be modified based on the control context comprises causing a display of a user interface element in the user interface of the companion application to be modified based on the control context.

In some embodiments, the operations further include receiving a termination of the selection of the category of content on the media device; and in response to the detecting the termination of the selection, disabling the user control mode of the companion application.

Further embodiments operate by a non-transitory computer-readable medium having instructions stored thereon that, when executed by at least one computing device, cause the at least one computing device perform operations that including receiving a selection of a category of content on a media device. The content comprises contextual information. The media device is controlled by the companion application. The operations further include, in response to the receiving the selection, enabling a user control mode of the companion application. The operations further include determining a control context for the user interface. The operations further include causing a user interface of the companion application to be modified based on the control context. The operations further include providing for displaying the modified user interface of the companion application.

In some embodiments, the operation of the receiving the selection of the category of content comprises receiving a user input from a remote control associated with the media device, and the remote control comprises a tablet, laptop computer, smartphone, smartwatch, smart device or wearable device.

In some embodiments, the operation of the receiving the selection of the category of content comprises: receiving an audio command to select a content on the media device; identifying metadata associated with the content; and determining the category of content based on the metadata.

In some embodiments, the operation of the enabling the user control mode of the companion application comprises: identifying a characteristic of a user based on the selection of the category of content; and enabling the user control mode of the companion application based on the characteristic of the user.

In some embodiments, the operation of the determining the control context for the user interface based on the contextual information comprises: dynamically determining the control context based on a media stream currently being played on the media device.

In some embodiments, the operation of the causing the user interface of the companion application to be modified based on the control context comprises causing a display of a user interface element in the user interface of the companion application to be modified based on the control context.

In some embodiments, the operations further include receiving a termination of the selection of the category of content on the media device; and in response to the detecting the termination of the selection, disabling the user control mode of the companion application.

BRIEF DESCRIPTION OF THE FIGURES

The accompanying drawings are incorporated herein and form a part of the specification.

FIG. 4A illustrates a first example user interface for controlling multimedia content playback, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for enabling a user control mode of a companion application.

Figure 1:
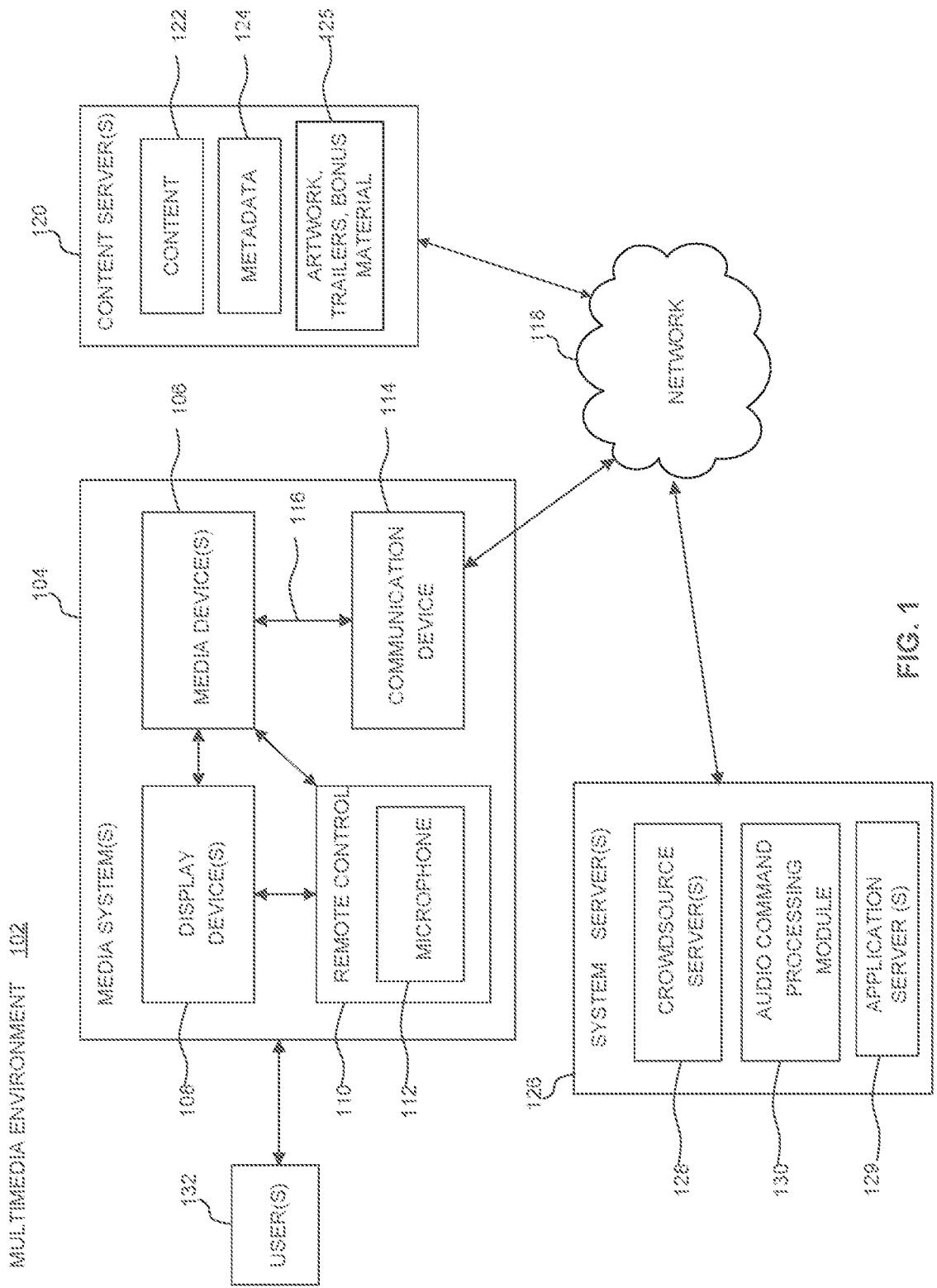
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, smartwatch, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Each content server 120 may also store, but not limited to, artwork, trailers, and bonus material 125 associated with content 122 and/or metadata 124.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128. The crowdsource server(s) 128 can include big data backend type of systems. The crowdsource server(s) 128 can crowdsource data from various devices (e.g., other media devices 106) from crowd or different users. The crowdsource server(s) 128 can monitor the data from the crowd or different users and take appropriate actions.

In some examples, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
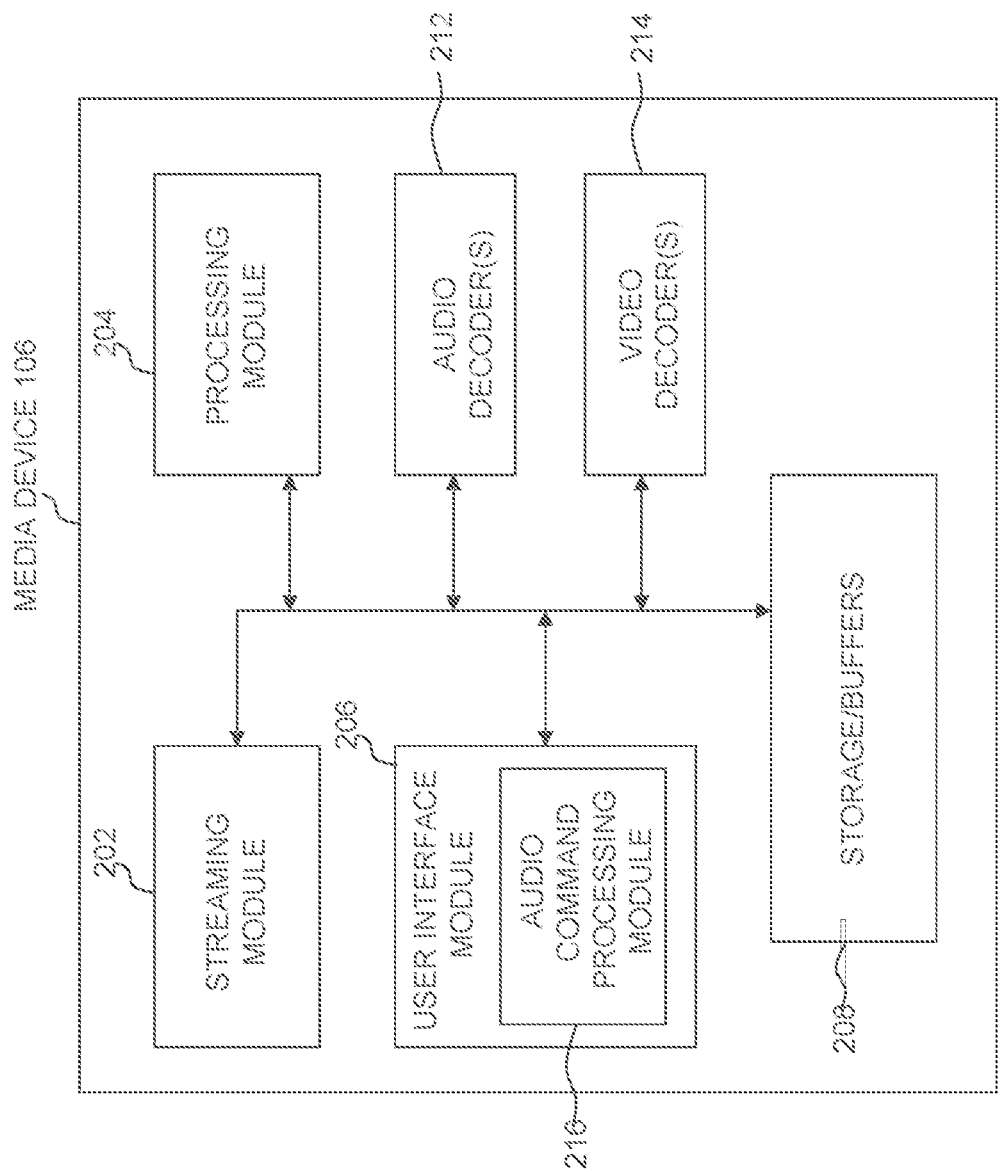
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

In some embodiments, the system servers 126 may include one or more application servers 129. One or more application servers 129 can include a digital distribution platform for one or more companion applications associated with media systems 104 and/or media devices 106. For example, user 312 may use the one or more companion applications to control media device 106 and/or display device 108. One or more application servers 129 can also manage login credentials and/or profile information corresponding to media systems 104 and/or media devices 106. The profile information may include names, usernames, and/or data corresponding to the content or media viewed by users 132.

In addition or alternatively, one or more application servers 129 may include or be part of a distributed client/server system that spans one or more networks, for example, a local area network (LAN), wide area network (WAN), the Internet, a cellular network, or a combination thereof connecting any number of mobile clients, fixed clients, and servers. In some aspects, communication between each client (e.g., user 132 or remote control 110) and server (e.g., one or more application servers 129) can occur via a virtual private network (VPN), Secure Shell (SSH) tunnel, or other secure network connection. One or more application servers 129 may also be separate from system servers 126, or in a different location than shown in FIG. 1, as will be understood by a person of ordinary skill in the art.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

User Control Mode of a Companion Application

Referring to FIG. 1, a user 132 may control (e.g., navigate through available content, select content, play or pause multimedia content, fast forward or rewind multimedia content, switch to a different channel, adjust the volume or brightness of display device 108, etc.) the media device 106 and/or display device 108 using remote control 110. Remote control 110 can be any component, part, apparatus and/or method for controlling the media device 106 and/or display device 108, such as a remote control with physical buttons, a tablet, laptop computer, smartphone, smart device, smartwatch, wearable, on-screen controls, integrated control buttons, audio controls, or any combination thereof, to name just a few examples. In an embodiment, the remote control 110 can wirelessly communicate with the media device 106 and/or display device 108 using WiFi, Bluetooth, cellular, infrared, etc., or any combination thereof. The remote control 110 may include a microphone 112. In some aspects, remote control 110 may supply a command to media device 106 via user interface module 206. This command may be provided via menu selections displayed on remote control 110. In some aspects, user 132 may press arrow keys on a remote control with physical buttons, to control media device 106 and/or display device 108.

In some aspects, remote control 110 can include a companion application on an electronic device associated with user 132, using for example, a remote control feature, to control media device 106 and/or display device 108. A companion application can be a software application designed to run on smartphones, tablet computers, smart device, smartwatch, wearable, internet of things (IoT) device, desktop computers and other electronic devices. Typically, an electronic device can offer an array of applications, including a companion application, to a user. These applications may be free or purchased through an application store and installed at the user's electronic device.

The companion application can be a software application that run on a different device than the primary intended or main application, for example on media device 106. The companion application can provide content that is similar to the primary user experience but could be a subset of it, having fewer features and being portable in nature.

For example, user 132 may use selections on a user interface on remote control 110, such as a companion application on an electronic device, to control media device 106 and/or display device 108. User 132 may use arrow keys or selections on the user interface on the companion application to navigate a grid of tiles, where each tile represents a channel associated with media device 106 and/or display device 108. User 132 may also use buttons or selections on the companion application to trigger an operation associated with media device 106 and/or display device 108. For example, user 132 may also use buttons or selections on remote control 110 to trigger fast-forwarding the speed of playback of multimedia content by media device 106. Accordingly, when remote control 110 are discussed herein, it should be understood that remote control 110 may be or may include any combination of a remote control with physical buttons and/or companion applications.

However, using remote control 110 to control media device 106 can be challenging due to, for example, a design of a user interface, and/or multiple selections or button presses being required for certain actions (e.g., menu actions). These often result in increased user frustration and reduced user satisfaction. Especially, using remote control 110 may not be easy or friendly to children and may require adults to use the remote control 110 to manage changes of content and channel for the children. For example, it often can be difficult or take a very long time for the user, especially of certain age groups such as children, to identify or locate the selections or buttons being required for certain actions (e.g., menu actions). In addition, age inappropriate content may be inadvertently shown to children when wrong buttons are clicked by children.

To solve the above technological problems, embodiments and aspects herein involve application server 129 enabling a user control mode of a companion application. The companion application can include remote control 110 or other functionalities to control media device 106 and/or display device 108. According to some embodiments, application server 129 can be configured to receive a selection of a category of content on media device 106. The content can include contextual information. According to some embodiments, media device 106 and/or display device 108 can be controlled by the companion application. For example, the companion application may be installed on the electronic device to remote control media device 106 and/or display device 108. The companion application may be downloaded from application server 129. In response to the receiving the selection, application server 129 may be configured to enable a user control mode of the companion application. Application server 129 may be configured to determine control context for the companion application based on the contextual information. Application server 129 may be configured to modify a user interface of the companion application based on the control context. Application server 129 may be configured to provide for display the modified user interface of the companion application. Finally, user 132 can interact with the modified user interface of the companion application to control media device 106 and/or display device 108.

In the following discussion, application server 129 is described as performing various functions associated with enabling a user control mode of a companion application on an electronic device. However, system server 126, media device 106, remote control 110, and/or another electronic device as would be appreciated by a person of ordinary skill in the art may perform one or more of the functions associated with enabling a user control mode of a companion application.

Figure 3:
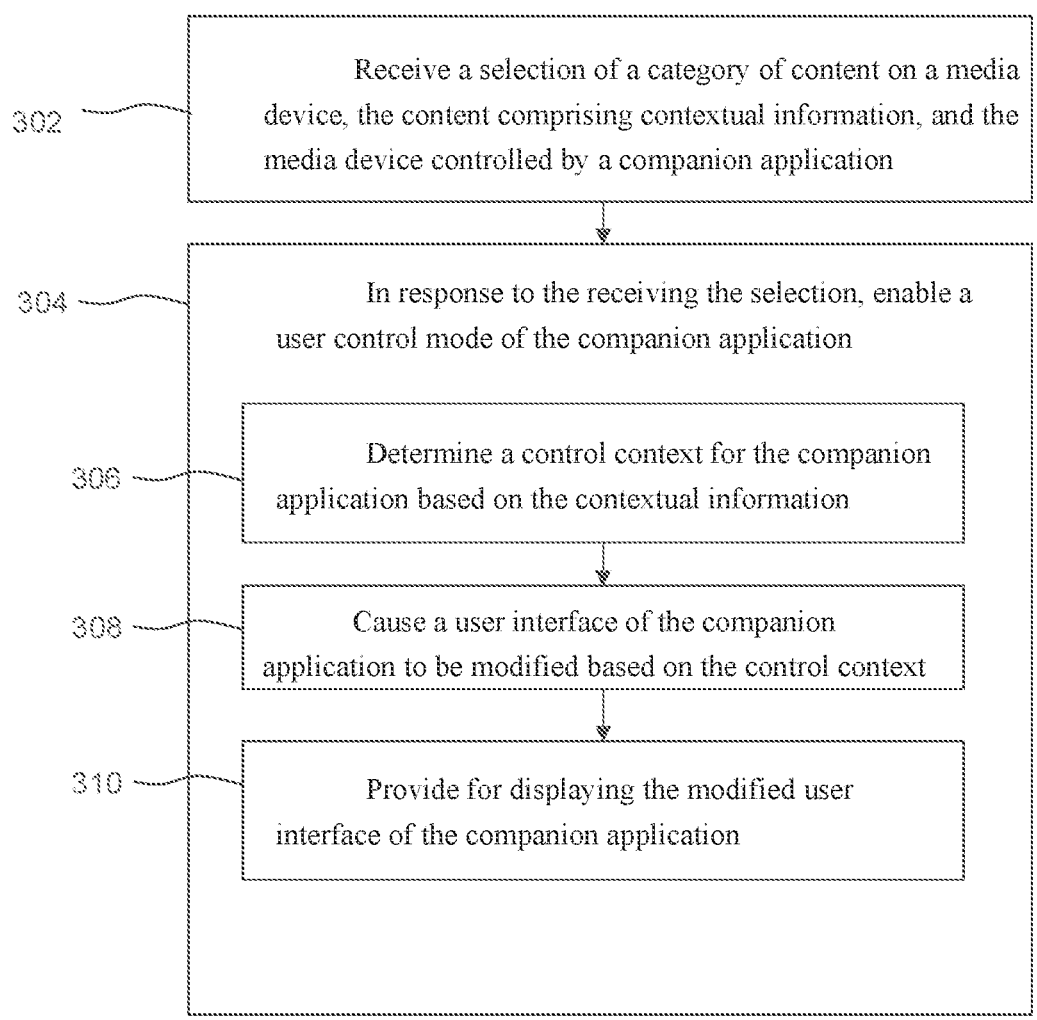
FIG. 3 illustrates a flowchart for a process for enabling a user control mode of a companion application, according to some embodiments.

FIG. 3 illustrates a flowchart for a method 300 for enabling a user control mode of a companion application, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Moreover, while the steps are described as being performed application server 129, some or all of the steps may be performed by system server 126, media device 106, remote control 110, or and/or another electronic device as would be appreciated by a person of ordinary skill in the art.

Method 300 shall be described with reference to FIGS. 1-2. However, method 300 is not limited to that example embodiment.

In step 302, application server 129 receives a selection of a category of content on media device 106. The content can include contextual information. Media device 106 can be controlled by a companion application (e.g., remote control 110).

According to some embodiments, as discussed above, the content, such as content 122, can include any combination of music, videos, movies, TV programs, multimedia, images, still pictures, text, graphics, gaming applications, advertisements, programming content, public service content, government content, local community content, software, and/or any other content or data objects in electronic form. The content may be categorized by different categories to indicating different themes, including for example, Kids, Drama, Horror, Action, Romance, Sci-Fi, Foreign, Live, Featured, Top 10, and/or Trending. In some examples, the content can include contextual information, such as characters, scenes, summary, or related content associated with the content.

According to some embodiments, as discussed above, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. As discussed above, artwork, trailers, and/or bonus material may be stored associated with content 122 and/or metadata 124. In one example, the artwork can be provided by a publisher and/or authorized partner with copyright protection associated with content 122 and/or metadata 124. In one example, the artwork can include still and/or animated images, related to contextual information, such as characters, scenes, summary, or related content associated with the content 122. In one example, the artwork can be displayed in one or more user interfaces of a user control mode for controlling multimedia content playback, such as for example, in FIGS. 4C and 4D.

According to some embodiments, application server 129 can receive a user input from remote control 110 to control media device 106. Remote control 110 can include a remote control with physical buttons as described with reference to FIG. 1. In some examples, remote control 110, such as a remote control with physical buttons, may include a microphone (e.g., microphone 112) for a user to provide a verbal command to provide a selection of a category of content on media device 106. For example, user 132 may provide an audio command, such as "play ABC movie" to select a content for children on media device 106.

According to some embodiments, as discussed above, remote control 110 can include a companion application on electronic device, such as including a smartphone, tablet, laptop computer, smartwatch, smart device or wearable device configured to communicate with media device 106. The electronic device may have an installed companion application configured to provide commands to media device 106. In some examples, user 132 may download the companion application from application server 129. In some examples, the companion application may be used to select a particular content channel for streaming content and/or content from the channel to stream. The companion application may transmit such commands to media device 106 to retrieve the desired content.

In some embodiments, a user can navigate one or more menus displayed on the companion application to provide a selection. These menus can be graphical user interfaces (GUI). The electronic device can also include a microphone for a user to provide a verbal command to provide a selection. In some examples, application server 129 or media device 106 can receive a user input, such as from a GUI or microphone, on the electronic device to select a category of content on media device 106. For example, user 132 can provide an audio command using the companion application, such as "play ABC movie", to select a content for children on media device 106.

In some examples, application server 129 can receive a selection of a category of content on media device 106, based on a determination of an identity of user 132. Application server 129 can determine the identity of user 132 who is operating remote control 110 in a variety of ways. For example, application server 129 can determine the identity of user 132 by capturing and processing an image and/or audio sample of user 132 operating remote control 110. Also or additionally, application server 129 can determine an identity of user 132 operating remote control 110 based on the currently logged in user, such as a user profile, to media device 106. For example, application server 129 can receive a selection of a content for children on media device 106, based on a currently logged in user profile of user 132 as a child. Application server 129 may use the identity of user 132 to customize the remote control 110, as further described below in step 304.

According to some embodiments, and still discussing step 302, application server 129 can receive a user input from media device 106. In some examples, media device 106 can also include a microphone for a user to provide a verbal command to provide a selection. In some examples, application server 129 can receive a user input, such as from user interface module 206, to select a category of content on media device 106.

According to some embodiments, application server 129 can receive a user input from a smart device and/or an Internet of Things (IoT) device associated with media device 106. For example, the smart device and/or the IoT device can include a smart speaker, such as a Wi-Fi-enabled speaker with voice assistants. The smart device and/or the IoT device can be controlled using a voice of a user. In some examples, application server 129 can receive a user input, such as from a microphone, on the smart device and/or the Internet of Things (IoT) device to select a category of content on media device 106. For example, user 132 may provide an audio command, such as "play ABC movie", to a smart speaker to select a content for children on media device 106.

As noted above, system servers 126 may include an audio command processing module 130. Remote control 110 or a connected smart device or IoT device may include a microphone 112. The microphone 112 may receive audio data from users 132 (as well as other sources, such as the display device 108). In some embodiments, media device 106 may be audio responsive, and the audio data may represent verbal commands from the user 132 to control the media device 106 as well as other components in the media system 104, such as the display device 108. In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing. In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

According to some embodiments, application server 129 may detect an audio command, such as from remote control 110, media device 106, and/or a smart device or an IoT device associated with media device 106, to select a content on media device 106. Application server 129 or media device 106 may identify metadata associated with the content. Application server 129 or media device 106 may determine the category of content based on the metadata. For example, application server 129 or media device 106 may determine the category of content based on automatic content recognitions by system servers 126 or media device 106.

In step 304, in response to the receiving the selection, application server 129 enables a user control mode of the companion application.

According to some embodiments, application server 129 can identify a characteristic of a user based on the selection of the category of content. A characteristic of user 132 may include age, physical disability, left or right handedness, or other characteristic pertinent to operation of remote control 110 as would be appreciated by persons skilled in the art. Also or alternatively, application server 129 may identify a characteristic of user 132 based on the media stream it is currently selected on media device 106. Also or alternatively, application server 129 may identify a characteristic of user 132 based on the currently logged in user profile to media device 106.

In some embodiments, application server 129 may identify a characteristic of user 132 based on remote control 110. In some embodiments, remote control 110 may include a camera, and/or an accelerometer or other motion sensing module (not shown in FIG. 1). Remote 110 may capture and process an image of user 132 operating remote control 110 to identify user 132. Additionally, remote control 110 may include a well-known sensor (not shown) for voice identification. Application server 129, media device 106 and/or system server 126 may recognize user 132 via his or her voice in a well-known manner, when user 132 speaks into microphone 112 of remote control 110 or a connected IoT device. These and additional techniques and approaches for identifying a characteristic of user 132 are within the scope and spirit of this disclosure, as will be apparent to persons skilled in the relevant arts based on the herein teachings. Also or additionally, as discussed above, application server 129 may identify a characteristic of user 132 based on a determination of an identity of user 132.

According to some embodiments, in 304, application server 129 can enable the user control mode of the companion application based on the characteristic of the user. For example, application server 129 can enable a child control mode of the companion application based on the characteristic of the user as a child.

Particularly, in step 306, application server 129 determines a control context for the companion application based on the contextual information.

According to some embodiments, a control context may indicate what type of menu and/or screen is being output by the user interface of the companion application. A control context may indicate a state of a user interface element (e.g., active, inactive, ready to receive input, etc.) on the user interface being output by the companion application. In some examples, application server 129 can determine the control context to delete, modify and/or insert some user interface elements on the user interface of the companion application. A control context may indicate which user interface elements on the user interface being output by the electronic device are capable of being modified based on the contextual information. A user interface element may include an input control, navigational and informational components. A user interface may be displayed as one of the buttons, menus, windows, check boxes, text fields, progress bars, drop-down lists or other visual elements.

A control context may be determined dynamically or statically. In some examples, application server 129 may statically determine a control context for the user interface for the user control mode of the companion application. In some examples, application server 129 may statically determine a control context to modify some user interface elements on the user interface based on the contextual information. For example, application server 129 may modify displays of some user interface elements based on an image of a character in the selected content.

In some examples, application server 129 may dynamically determine a control context based on a media stream selected or currently being played on media device 106. The application server 129 may dynamically determine the control context to dynamically insert or update additional content or user interface element.

The user control mode of the companion application can include a context aware user control mode of companion application associated with one or more systems (e.g., system server 126 or other servers), applications, scenarios, content genres etc. The one or more systems, applications, scenarios, content genres may individually or collectively determine additional content or user interface element to be displayed on the companion application based on the contextual information. In addition, the one or more systems, applications, scenarios, content genres may individually or collectively determine an appropriate time for the additional content or user interface element to be displayed on the companion application. The additional content or user interface element may be determined and updated dynamically based on the change on the contextual information. The additional content or user interface element may not be included in the companion application prior to the enabling the user control mode of the companion application.

In some examples, application server 129, system server 126 or media device 106 may perform language processing based on the keywords or sentences of the media stream currently being played on media device 106. In addition, application server 129 or system server 126 may perform image processing based on the images of the media stream currently being played on media device 106. Then, application server 129 or system server 126 may identify, for example, a topic of a conversation in the media stream currently being played on media device 106. Application server 129 may dynamically determine a control context to insert additional content or user interface element based on the topic of the conversation. For example, system server 126 or application server 129 may identify, for example, a math topic of a conversation in the media stream currently being played on media device 106. The system server 126 or application server 129 may determine additional content or user interface element related to math and children, such as a math quiz. Application server 129 may dynamically insert a pop-up window to show "what is 5+7?" when the conversation in the media stream currently being played on media device 106.

In some examples, application server 129 may dynamically determine a control context based on the category of content. Application server 129 may dynamically insert additional content or user interface element for the user interface for the user control mode of the companion application, for example including, games or educational content, based on a content for children is selected on media device 106.

In some examples, application server 129 may dynamically determine a control context based on a state of media device 106. Application server 129 may dynamically insert an audio command or a user interface element, such as "select this", when media device 106 is paused. Application server 129 may dynamically insert additional content for playback on the user interface of the companion application, before the next content is played on media device 106. Application server 129 may dynamically insert additional content for playback on the user interface of the companion application, after an advertisement ends.

In some examples, application server 129 may determine the control context using a machine learning mechanism. System servers 126 or media device 106 may perform a machine learning based on content data, historical watch data, user data, and various other data as would be appreciated by a person of ordinary skill in the art. System server 126 may perform the machine learning by crowdsourcing data from various devices (e.g., other media devices 106).

In step 308, application server 129 modifies a user interface of the companion application based on the control context.

According to some embodiments, based on the control context, system server 126 can delete, modify and/or insert user interface elements on the user interface of the companion application. In addition or alternatively, system server 126 can insert additional content on the user interface of the companion application. Exemplary modified user interfaces of the companion application will be discussed with reference to FIGS. 4B-D. For example, application server 129 may modify or switch the user interface of the companion application to a user interface that is easier for a child to use.

In step 310, application server 129 provides for display the modified user interface of the companion application.

According to some embodiments, application server 129 can detect a termination of the selection of the category of content on media device 106. Application server 129 can detect a termination of the selection based on a selection of a different category of content than the category of content previously selected. Application server 129 can detect a termination of the selection based on a state of companion application or companion device, such as inactivity for a threshold period of time. Application server 129 can detect a termination of the selection based on reaching a predetermined time limit of screen time associated with the electronic device.

According to some embodiments, application server 129 can, in response to the detecting the termination of the selection of the category of content on media device 106, disable the user control mode of the companion application.

In some aspects, application server 129 can refrain from modifying the user interface of the companion application based on the control context. Application server 129 can refrain from providing for display the modified user interface of the companion application. Application server 129 can resume the companion application and/or displaying a user interface of the companion application prior to enabling the user control mode of the companion application.

FIG. 4A illustrates a first example user interface for controlling multimedia content playback, according to some embodiments. A companion application (e.g., remote control 110) on an electronic device may output user interface 400. For example, user interface 400 may be provided to control multimedia content playback on media device 106 and/or display device 108. User interface 400 may be provided in association with a server (e.g., application server 129 of FIG. 1, as described above) that can be a digital distribution platform for companion applications. However, user interface 400 is not limited thereto.

User interface 400 includes various user interface elements 410 to control multimedia content playback on media device 106 and/or display device 108. As will be appreciated by persons skilled in the relevant arts, user interface elements 410 may be used to navigate through menus displayed on the display device 108, change the channel and volume, go to the home screen, change settings of the display device 108 and/or the media device 106, etc.

User 132 may perform a user interaction with user interface 400 to control multimedia content playback on media device 106 and/or display device 108. User interaction with user interface 400 may include tapping on (e.g., via touch input or stylus input), clicking (e.g., via mouse), scrolling, and/or other methods as would be appreciated by a person of ordinary skill in the art.

User interface 400 may also be displayed as different shapes, colors, and sizes. Additionally, user interface 400 may have less user interface elements 410 or more user interface elements 410 than depicted in FIG. 4A. In embodiments, despite having different shapes, colors, sizes, etc., user interface 400 has the same or substantially the functionality. That is, user interface 400 may enable user 132 to interact with media device 106 and/or display device 108 as discussed herein.

Figure 4B:
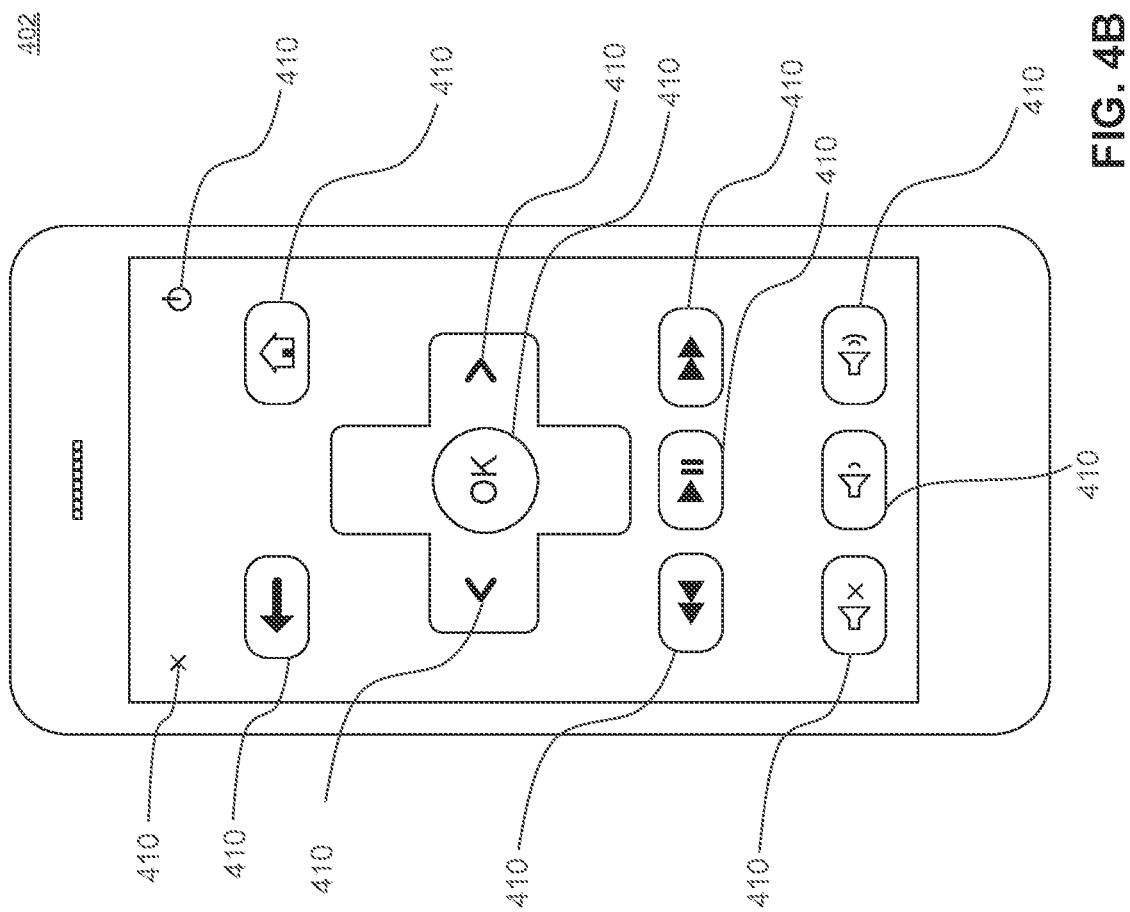
FIG. 4B illustrates a second example user interface of a user control mode for controlling multimedia content playback, according to some embodiments.
Figure 4C:
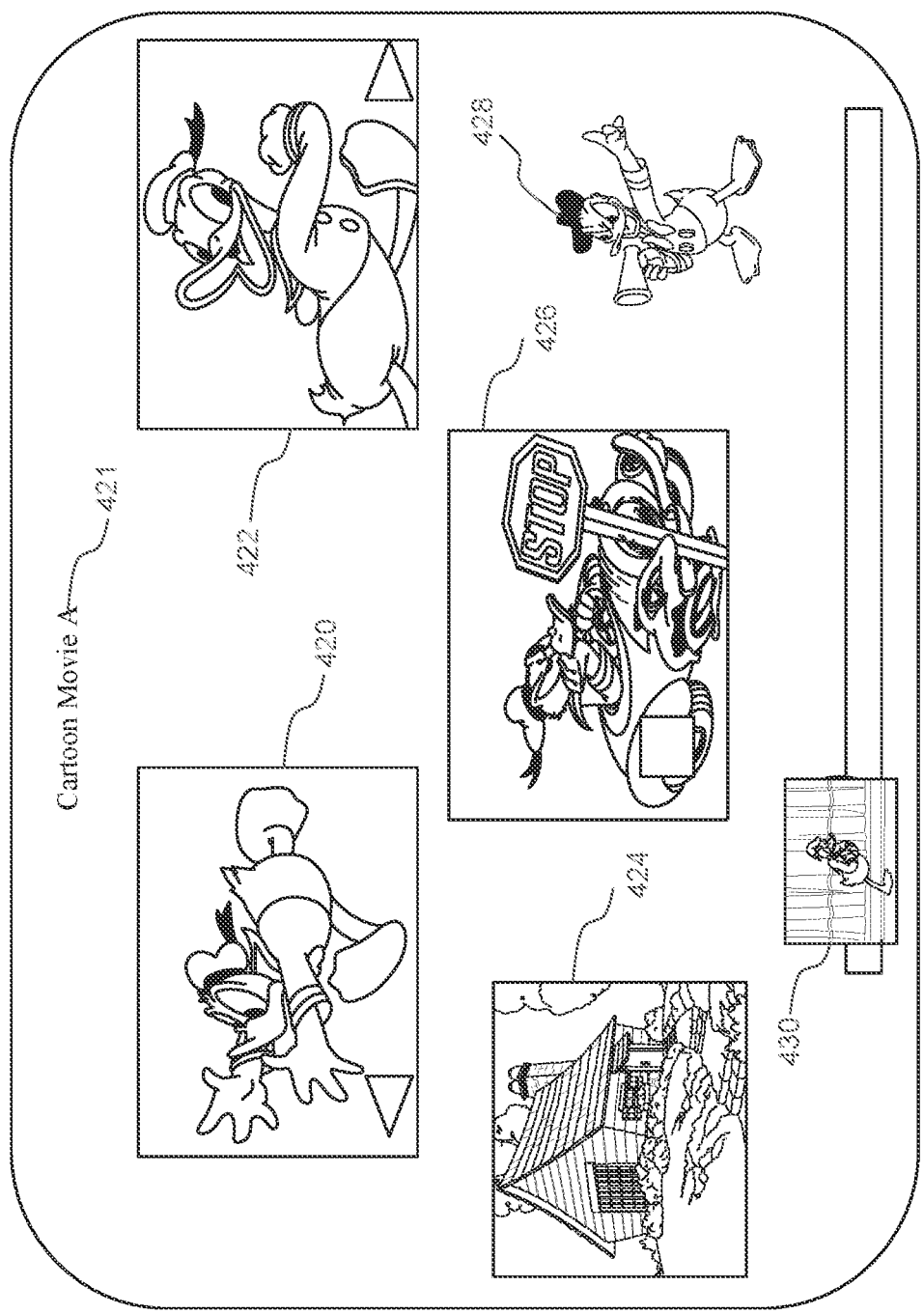
FIG. 4C illustrates a third example user interface of a user control mode for controlling multimedia content playback, according to some embodiments.
Figure 4D:
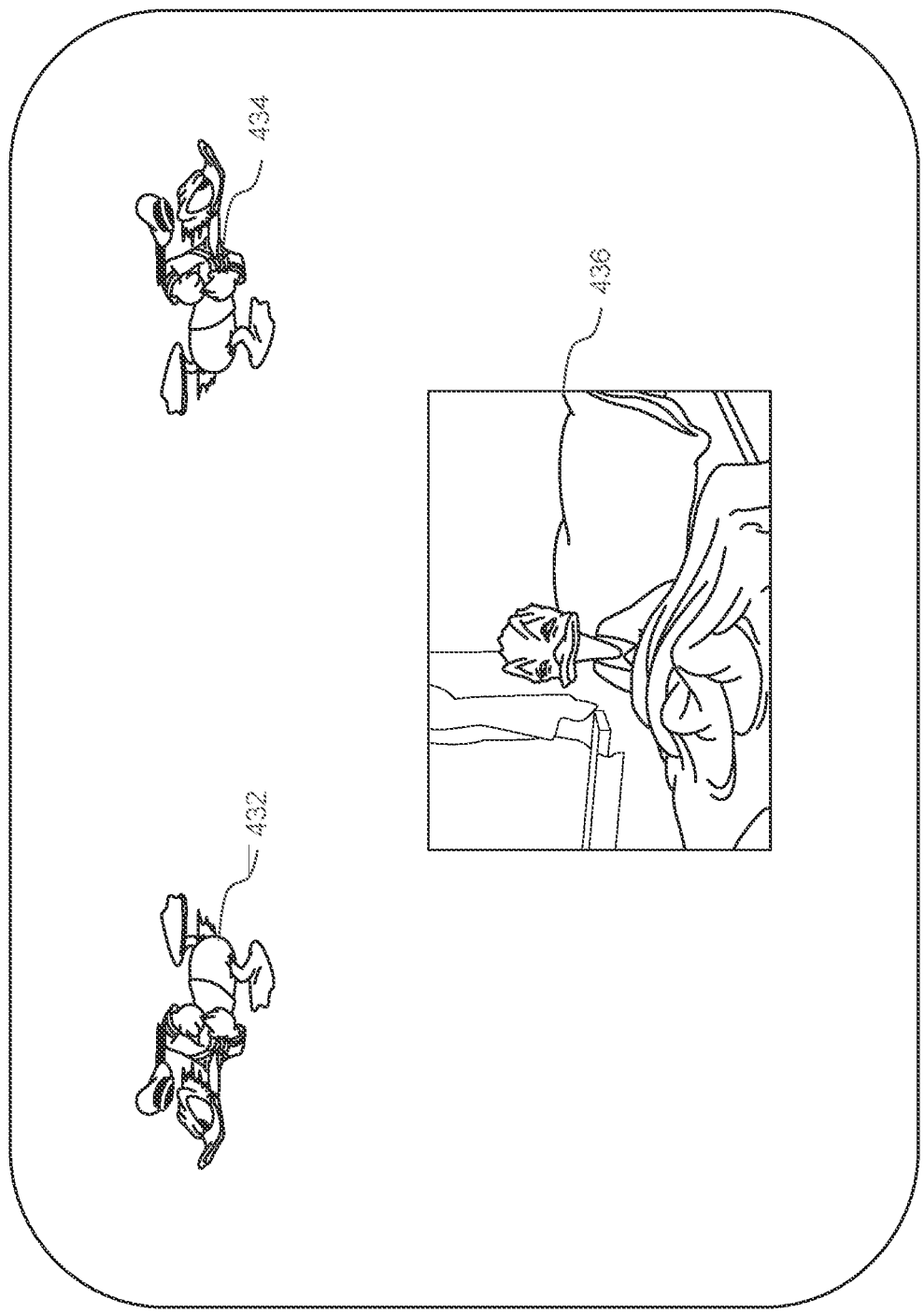
FIG. 4D is illustrates a fourth example user interface of a user control mode for controlling multimedia content playback, according to some embodiments.

FIG. 4B illustrates a second example user interface of a user control mode for controlling multimedia content playback, according to some embodiments. FIG. 4C illustrates a third example user interface of a user control mode for controlling multimedia content playback, according to some embodiments. FIG. 4D is illustrates a fourth example user interface of a user control mode for controlling multimedia content playback, according to some embodiments. A companion application (e.g., remote control 110) on an electronic device may output user interfaces 402, 404 and/or 406. For example, user interface 402, 404 and/or 406 may be provided in a user control mode to control multimedia content playback on media device 106 and/or display device 108. User interface 402, 404 and/or 406 may be provided in association with a server (e.g., application server 129 of FIG. 1, as described above) that can be a digital distribution platform for companion applications. However, user interfaces 402, 404 and/or 406 are not limited thereto. User interfaces 402, 404 and/or 406 may be switched or modified from user interface 400 when a user control mode of the companion application is enabled.

As described above, application server 129 can enable a user control mode of the companion application, in response to the receiving a selection of a category of content on media device 106. For example, application server 129 can enable a child friendly mode, in response to the receiving a selection of kids and family content on media device 106. Application server 129 can modify user interface 400 to user interfaces 402, 404 and/or 406 in the user control mode of the companion application. As shown in FIG. 4B, user interface 402 can include less user interface elements 410, compared with user interface 400. Some of the user interface elements 410 from user interface 400 may be removed. Alternatively or in addition, user interface elements 410 may be larger than depicted in FIG. 4B, to ease operation for children.

As shown in FIG. 4B, user interface 402 includes user interface elements 410 to control multimedia content playback on media device 106 and/or display device 108. As described above, as will be appreciated by persons skilled in the relevant arts, user interface elements 410 may be used to navigate through menus displayed on the display device 108, change the channel and volume, go to the home screen, change settings of the display device 108 and/or the media device 106, etc. User 132 may perform a user interaction with user interface 402 to control multimedia content playback. User interaction with user interface 402 may include tapping on (e.g., via touch input or stylus input), clicking (e.g., via mouse), scrolling, and/or other methods as would be appreciated by a person of ordinary skill in the art.

User interface 402 may also be displayed as different shapes, colors, and sizes. Additionally, user interface 402 may have less user interface elements 410 or more user interface elements 410 than depicted in FIG. 4B. In embodiments, despite having different shapes, colors, sizes, etc., user interface 402 has the same or substantially the same functionality. That is, user interface 402 may enable user 132 to interact with media device 106 and/or display device 108 as discussed herein.

In some aspects, user interface 402 and/or user interface elements 410 may be child friendly, such as in the shape of an animal, a super hero, a toy car, a princess doll, etc. In addition or alternatively, user interface elements 410 in user interface 402 may be designated specifically for a children content or a channel, for example, as will be described further with reference to FIGS. 4C-4D.

As described above, application server 129 can enable a user control mode of the companion application as a child friendly mode, in response to the receiving a selection of kids and family content on media device 106. For example, application server 129 can receive a selection of a cartoon movie "A" on media device 106. Application server 129 can determine a control context for the companion application based on the contextual information associated with the cartoon movie "A". For example, system server 126 can modify user interface 400 to display as user interfaces 404 and/or 406, based on a character and/or a scene of the cartoon movie "A" in the user control mode of the companion application.

As shown in FIGS. 4C-4D, user interface elements in user interfaces 404 and/or 406 can be designated specifically based on the cartoon movie A. A name of the cartoon movie A 421 can be displayed in user interface 404 to indicate a currently selected content. Rewind button 420, forward button 422, home button 424, pause button 426, volume adjusting button 428, seek cursor 430 in a progress bar, fast rewind button 432, fast forward button 434, or exit home screen button 436 can be displayed to represent a motion of a character or a scene associated with the cartoon movie A. Although rewind button 420, forward button 422, home button 424, pause button 426, volume adjusting button 428, seek cursor 430 in a progress bar, fast rewind button 432, fast forward button 434, or exit home screen button 436 are shown in FIGS. 4C-4D, any other user interface elements 410 in user interface 402 can be designated specifically for a children content or a channel, as would be appreciated by a person of ordinary skill in the art. Other user interface elements, such as including an animation, can also be inserted in user interfaces 404 and/or 406 designated specifically for a children content or a channel.

Alternatively or in addition, user interfaces 404 and/or 406 may have less user interface elements or more user interface elements than depicted in FIGS. 4C-4D. In embodiments, despite having different shapes, colors, sizes, etc., user interfaces 404 and/or 406 have the same or substantially the functionality. That is, user interfaces 404 and/or 406 may enable user 132 to interact with media device 106 and/or display device 108 as discussed herein.

Example Computer System

Figure 5:
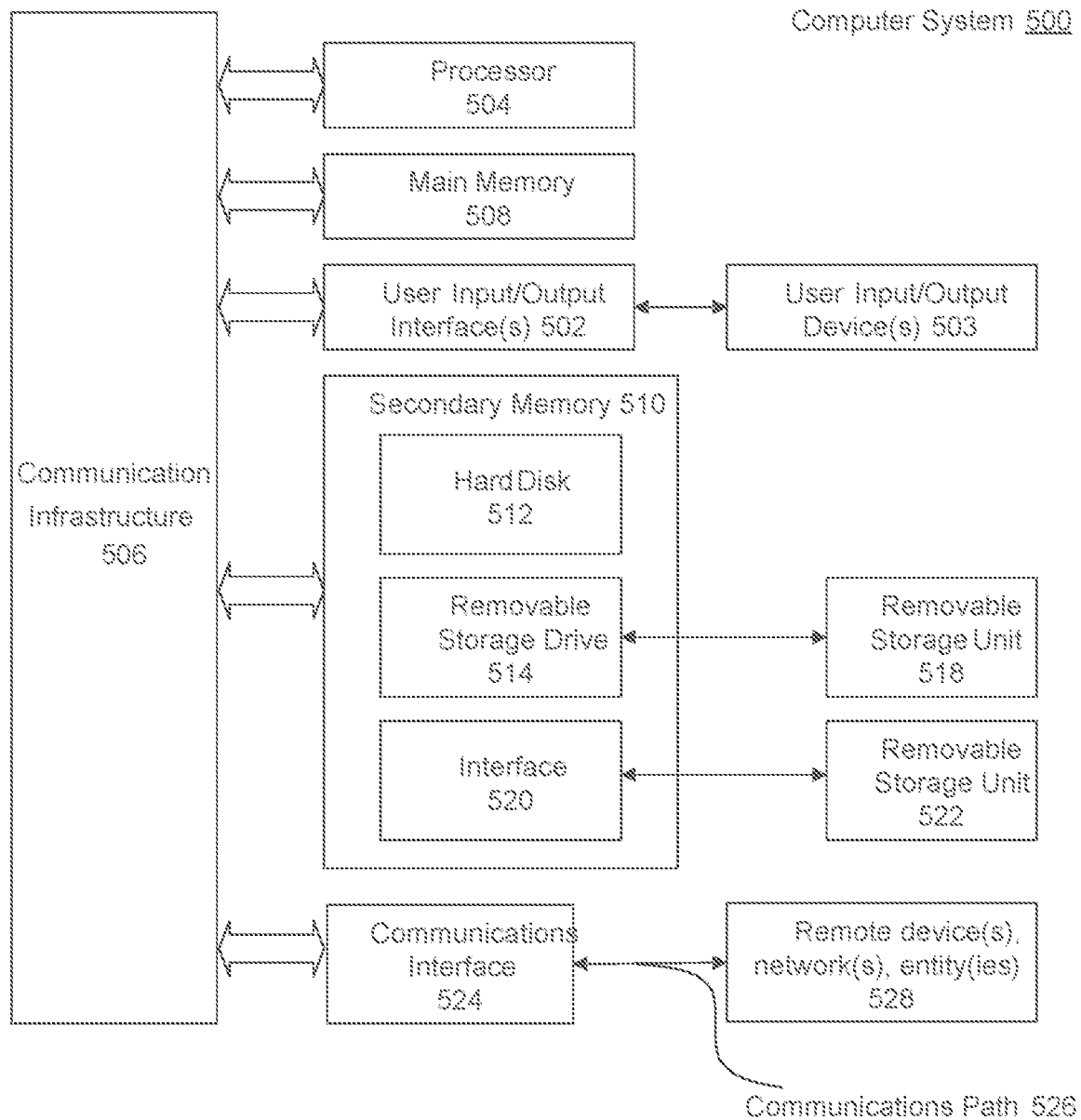
FIG. 5 illustrates an example computer system useful for implementing various embodiments.

Various embodiments may be implemented, for example, using one or more well-known computer systems, such as computer system 500 shown in FIG. 5. For example, application server 129 may be implemented using combinations or sub-combinations of computer system 500. Also or alternatively, application server 129 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for enabling a user control mode of a companion application, comprising:
   receiving, by at least one computer processor, a selection of a category of content on a media device, wherein the content comprises contextual information, and wherein the media device is controlled by the companion application operated by a user; and
   in response to the receiving the selection, enabling the user control mode of the companion application, comprising:
      identifying a characteristic of the user based on the selection of the category of content, a media stream currently selected on the media device, or a determination of an identity of the user; and
      enabling the user control mode of the companion application based on the identification of the characteristic of the user;
   determining the contextual information based on identifying a topic of conversation in the media stream;
   determining a control context for the companion application based on the contextual information;
   causing a user interface of the companion application to be modified based on the control context; and
   providing for displaying the modified user interface of the companion application.

2. The computer-implemented method of claim 1, wherein the receiving the selection of the category of content comprises receiving a user input from a remote control associated with the media device, and wherein the remote control comprises a tablet, laptop computer, smartphone, smartwatch, smart device or wearable device.

3. The computer-implemented method of claim 1, wherein the receiving the selection of the category of content comprises:
   receiving an audio command to select a content on the media device;
   identifying metadata associated with the content; and
   determining the category of content based on the metadata.

4. The computer-implemented method of claim 1, wherein the determining the control context for the companion application based on the contextual information comprises:
   dynamically determining the control context based on a media stream currently being played on the media device, the category of content, a state of the media device, or using a machine learning mechanism.

5. The computer-implemented method of claim 1, wherein the causing the user interface of the companion application to be modified based on the control context comprises:
   causing a display of a user interface element in the user interface of the companion application to be modified based on the control context.

6. The computer-implemented method of claim 1, further comprising:
   receiving a termination of the selection of the category of content on the media device; and
   in response to the receiving the termination of the selection, disabling the user control mode of the companion application.

7. The computer-implemented method of claim 1, wherein the causing the user interface of the companion application to be modified based on the control context comprises:
   incorporating artwork associated with the content in a playback control of the user interface.

8. A computing system for enabling a user control mode of a companion application, comprising:
   one or more memories; and
   at least one processor each coupled to at least one of the memories and configured to perform operations comprising:
      receiving a selection of a category of content on a media device, wherein the content comprises contextual information, and wherein the media device is controlled by the companion application operated by a user; and
      in response to the receiving the selection, enabling the user control mode of the companion application, comprising:
         identifying a characteristic of the user based on the selection of the category of content, a media stream currently selected on the media device, or a determination of an identity of the user; and
         enabling the user control mode of the companion application based on the identification of the characteristic of the user;
      determining the contextual information based on identifying a topic of conversation in the media stream;

determining a control context for the companion application based on the contextual information;
causing a user interface of the companion application to be modified based on the control context; and
providing for displaying the modified user interface of the companion application.

9. The computing system of claim 8, wherein the operation of the receiving the selection of the category of content comprises receiving a user input from a remote control associated with the media device, and wherein the remote control comprises a tablet, laptop computer, smartphone, smartwatch, smart device or wearable device.

10. The computing system of claim 8, wherein the operation of the receiving the selection of the category of content comprises:
receiving an audio command to select a content on the media device;
identifying metadata associated with the content; and
determining the category of content based on the metadata.

11. The computing system of claim 8, wherein the operation of the determining the control context for the companion application based on the contextual information comprises:
dynamically determining the control context based on a media stream currently being played on the media device, the category of content, a state of the media device, or using a machine learning mechanism.

12. The computing system of claim 8, wherein the operation of the causing the user interface of the companion application to be modified based on the control context comprises:
causing a display of a user interface element in the user interface of the companion application to be modified based on the control context.

13. The computing system of claim 8, the operations further comprising:
receiving a termination of the selection of the category of content on the media device; and
in response to the receiving the termination of the selection, disabling the user control mode of the companion application.

14. The computing system of claim 8, wherein the operation of the causing the user interface of the companion application to be modified based on the control context comprises:
incorporating artwork associated with the content in a playback control of the user interface.

15. A non-transitory computer-readable medium having instructions stored thereon that, when executed by at least one computing device, cause the at least one computing device to perform operations comprising:
receiving a selection of a category of content on a media device, wherein the content comprises contextual information, and wherein the media device is controlled by a companion application operated by a user; and
in response to the receiving the selection, enabling a user control mode of the companion application, comprising:
identifying a characteristic of the user based on the selection of the category of content, a media stream currently selected on the media device, or a determination of an identity of the user; and
enabling the user control mode of the companion application based on the identification of the characteristic of the user;
determining the contextual information based on identifying a topic of conversation in the media stream;
determining a control context for the companion application based on the contextual information;
causing a user interface of the companion application to be modified based on the control context; and
providing for displaying the modified user interface of the companion application.

16. The non-transitory computer-readable medium of claim 15, wherein the operation of the receiving the selection of the category of content comprises receiving a user input from a remote control associated with the media device, and wherein the remote control comprises a tablet, laptop computer, smartphone, smartwatch, smart device or wearable device.

17. The non-transitory computer-readable medium of claim 15, wherein the operation of the receiving the selection of the category of content comprises:
receiving an audio command to select a content on the media device;
identifying metadata associated with the content; and
determining the category of content based on the metadata.

18. The non-transitory computer-readable medium of claim 15, wherein the operation of the determining the control context for the companion application based on the contextual information comprises:
dynamically determining the control context based on a media stream currently being played on the media device, the category of content, a state of the media device, or using a machine learning mechanism.

19. The non-transitory computer-readable medium of claim 15, wherein the operation of the causing the user interface of the companion application to be modified based on the control context comprises:
causing a display of a user interface element in the user interface of the companion application to be modified based on the control context.

20. The non-transitory computer-readable medium of claim 15, wherein the operation of the causing the user interface of the companion application to be modified based on the control context comprises:
incorporating artwork associated with the content in a playback control of the user interface.

* * * * *

UNITED STATES PATENT AND TRADEMARK OFFICE
CERTIFICATE OF CORRECTION

| | |
|---|---|
| PATENT NO. | : 12,260,076 B2 |
| APPLICATION NO. | : 18/204168 |
| DATED | : March 25, 2025 |
| INVENTOR(S) | : Karia |

Page 1 of 1

It is certified that error appears in the above-identified patent and that said Letters Patent is hereby corrected as shown below:

In the Specification

In Column 7, Line 20, delete "(wmy," and insert -- (wmv, --, therefor.

Signed and Sealed this
Eighteenth Day of November, 2025

John A. Squires
*Director of the United States Patent and Trademark Office*